United States Patent [19]

Dessauer et al.

[11] 4,131,710

[45] Dec. 26, 1978

[54] RECORDING MATERIAL CONTAINING ASBESTOS

[75] Inventors: Güido Dessauer, Düsseldorf-Gerresheim; Kurt Ramlow, Schafflund; Kurt Riecke, Kempen; Franz Wirnitzer, Flensburg, all of Fed. Rep. of Germany

[73] Assignee: Feldmühle Aktiengesellschaft, Dusseldorf-Oberkassel, Fed. Rep. of Germany

[21] Appl. No.: 760,275

[22] Filed: Jan. 18, 1977

[30] Foreign Application Priority Data

Jan. 20, 1976 [DE] Fed. Rep. of Germany ....... 2601864

[51] Int. Cl.[2] .......................... B32B 5/16; B32B 9/06; B41M 5/16

[52] U.S. Cl. .................................... 428/328; 162/145; 162/153; 428/331; 428/329; 428/332; 428/914

[58] Field of Search ....................... 282/27.5; 427/150; 428/331, 332, 445, 379, 329, 308, 271, 251, 328, 537, 914; 162/145, 153

[56] References Cited

U.S. PATENT DOCUMENTS

| | | | |
|---|---|---|---|
| 2,505,479 | 4/1950 | Green | 282/27.5 |
| 3,619,345 | 11/1971 | Kubo et al. | 428/331 |
| 3,804,706 | 4/1974 | Kurashige et al. | 162/153 X |
| 3,850,791 | 11/1974 | Guittard | 162/153 X |
| 3,856,564 | 12/1974 | Kirkham | 428/445 |
| 3,864,146 | 2/1975 | Oda et al. | 282/27.5 |
| 3,925,416 | 12/1975 | Akamatsu et al. | 282/27.5 |
| 3,947,471 | 3/1976 | Akamatsu et al. | 282/27.5 |
| 3,997,696 | 12/1976 | Jaisle et al. | 428/445 |

*Primary Examiner*—Thomas J. Herbert, Jr.
*Attorney, Agent, or Firm*—Hans Berman

[57] ABSTRACT

A recording sheet consisting mainly of fibrous material is capable of displaying a colored image when contacted under pressure with substantially colorless crystal violet lactone and similar dye precursors if at least 3% of the fibrous material is constituted by uniformly distributed asbestos fibers. Sheets having adequate strength for carbonless copying should not contain more than 30% asbestos fibers. Stronger colors are obtained if the sheet further contains a mixture of $\gamma$-alumina and $\gamma$-alumina precursors in an amount of 2% to 20% of the weight of the fibrous material, the mixture containing 1% to 30% water volatile at 1000° C, and being converted substantially entirely to $\gamma$-alumina when heated from 300° to 1000° C.

10 Claims, No Drawings

RECORDING MATERIAL CONTAINING ASBESTOS

This invention relates to recording material, and particularly to a recording sheet capable of displaying a colored image when contacted under pressure with a substantially colorless dye precursor such as crystal violet lactone.

Recording sheets of the type described are employed for so-called carbonless copying, and were prepared heretofore on an industrial scale by coating a suitable fibrous substrate, usually paper, with a coating including pigments capable of reacting with the dye precursors. The coating operation is costly in materials, equipment, and labor, as compared to the manufacture of paper from aqueous fiber suspensions. Even the most efficient coating equipment can be operated only at speeds much lower than the highest speed of available paper making machines. It is necessary, therefore, to manufacture paper on a high-speed machine, and to coat the paper in a separate machine at lower speed. Alternatively, the paper-making and coating equipment may be operated in tandem at a speed lower than that at which the paper could be produced without the coating.

It is one of the primary objects of this invention to provide a recording sheet of the type described which can be produced on conventional paper-making machinery in a single step at the highest speed of which the machinery is capable.

Another object is the provision of a recording sheet which does not need the binder inherently required in coated paper, and is lower in weight and lower in cost for this reason.

The invention is based on the finding that fibrous asbestos is capable of converting crystal violet lactone, malachite green lactone, benzoyl leuco methylene blue, N-phenyl-leukauramine and similar, practically colorless dye precursors conventional in this art to the corresponding colored dyes, and that as little as 3% asbestos fibers uniformly distributed in the fibrous material mainly constituting a recording sheet of paper or the like imparts to the sheet, hereinafter referred to as acceptor sheet, the ability of displaying a colored image when contacted under pressure with one of the commercially available copying sheets coated with microencapsulated dye precursors, hereinafter referred to as donor sheets. The contrast between the colored image and the original color of the acceptor sheet increases generally with the amount of asbestos in the sheet, and conventional asbestos paper consisting almost entirely of asbestos produces colored images, but has no practical utility in a carbonless copying system because of its low mechanical strength at practical thickness values. For practical purposes, an asbestos content of 30% by weight, based on total fibrous material, cannot be exceeded.

An otherwise conventional paper containing uniformly distributed asbestos fibers reacts with all commercial donor sheets, but the image contrast achieved varies greatly between different donor sheets for reasons not directly relevant to this invention and including both the nature of the dye precursor employed and the manner in which it is bound to the substrate of the donor sheet.

Improved contrast with most donor sheets is achieved if the acceptor paper, in addition to asbestos fibers, contains uniformly distributed fine particles of a mixture of $\gamma$-alumina and precursors of $\gamma$-alumina. As disclosed in more detail in our simultaneously filed application, entitled "RECORDING MATERIAL CONTAINING GAMMA ALUMINA", a mixture of $\gamma$-alumina and of hydrated forms of aluminum oxide capable of being converted substantially completely to $\gamma$-alumina upon heating from 300° C. to 1000° C. is in itself capable of converting the afore-mentioned dye precursors to the corresponding dyes if the amount of water chemically bound to the precursors and volatilized at 1000° C. is between 1 and 30% of the mixture weight. The mixture is most effective as a pigment in a coating composition, but also produces a colored image when distributed uniformly among the fibers of a paper web. The improvement imparted to an asbestos-bearing fibrous web by the $\gamma$-alumina mixture in amounts of 2% to 20% of the fiber weight is much greater than would be expected from the acceptor characteristics of a fibrous web containing the $\gamma$-alumina mixture only.

Neither $\alpha$-alumina nor mixtures of $\gamma$-alumina with hydrated forms of aluminum oxide that do not convert to $\gamma$-alumina at 1000° C. are capable of reinforcing the effect of asbestos fibers, and the amount of volatile water in the mixture is critically important in the presence of asbestos fibers, as it has been described in the afore-mentioned application to be important in the absence of the asbestos.

Other substances known from our other applicaton to enhance the quality of colored images produced by means of the $\gamma$-alumina mixture alone are effective in the same manner when combined with asbestos fibers and $\gamma$-alumina mixture uniformly distributed among the fibers of a recording sheet.

A recording sheet providing optimum, image-forming characteristics with good mechanical strength is obtained, under otherwise identical conditions, with sheets in which 8% to 15% of the fibrous material is constituted by asbestos fibers, all percentage values herein being by weight, unless specifically stated otherwise. The size, more specifically the diameter of the asbestos fibers, has an important influence on the quality of the colored image. Rather weak images are produced by fibers thinner than 150 Angstrom units and heavier than 600 Å.. It is generally preferred to employ asbestos fibers having an average diameter of 200 to 350 Å. Such fibers have an active, adsorbent surface area of more than 50 $m^2/g$, as determined by the BET method, but better results are usually achieved at 60 $m^2/g$ or more. An active surface greater than 80 $m^2/g$ has not been found so far in asbestos fibers available to us and otherwise useful for this invention. The fibers, when suspended in water, are positively charged and have a zeta potential of about +40 mV at pH 7. The fiber length is less important than the diameter. Fibers having a length of approximately 5 $\mu m$ are satisfactory.

Commercial fibrous asbestos consists mostly of chrysotile, and chrysotile is the predominant component of the asbestos referred to in this application. However, limited tests indicate that fibers of asbestos belonging to the amphibole group of minerals are effective in substantially the same manner.

Asbestos fibers were employed in the paper industry prior to this invention in small amounts, not exceeding 2% of the total fiber weight, for improving retention of fillers and for remedying difficultiea due to rosin content of wood fibers in the furnish. Papers containing such small amounts of asbestos are not useful acceptors.

The known ability of asbestos fibers of retaining particulate fillers may be related to the observed cooperation between the asbestos fibers and finely divided γ-alumina mixture, the latter being preferably of an average particle size of 0.2 to 0.8 μm, the fraction larger than 0.8 μm not exceeding 10%.

Significant improvement in asbestos-bearing fibrous webs is observed in the presence of as little as 2% γ-alumina mixture. No further improvement is achieved by increasing the amount of the mixture to more than 20% of the total fiber weight.

Clays employed heretofore as reactive pigments in coated acceptor sheets, such as silton clay and other acid-washed Japanese clays, attapulgite, montmorillonite, and the like may be used in combination with the γ-alumina mixture in amounts of 2% to 20%, based on the total fibrous material, and enhance image formation in a manner not observed when such clays are merely employed as fillers in conventional paper.

Aluminum hydroxide (hydrargillite) and aluminum oxide hydrates, not themselves effective acceptors, may be used jointly with the γ-alumina mixture to improve light fastness of the colored images, the effective range being about the same as for the clays.

The recording sheets of the invention are produced on conventional paper-making machines, such as Fourdrinier type machines, from suspensions of web forming fibers, including the asbestos fibers, and non-fibrous, finely divided pigments such as the γ-alumina mixture, clays, aluminum hydroxide or oxide hydrates mentioned above.

If clays are employed in the form of hydrogels, for example, of Attagel (a colloidal attapulgite), it is preferred to use cellulose fibers in the mixture of fibrous materials, and to coat the cellulose fibers with the clay hyrogel before combining the cellulose fibers with asbestos fibers, and optionally other fibers, in an aqueous suspending medium. The hydrogel-coated cellulose fibers have dye acceptor properties of their own, as described in more detail in the commonly owned application Serial No. 624,721, filed on Oct. 22, 1975, by one of us.

Basic zinc compound, such as zinc oxide, zinc hydroxide, and water-insoluble basic zinc salts have been shown in our simultaneously filed application to enhance the durability of images formed by means of the γ-alumina mixture. Such zinc compounds are equally beneficial in the recording material of this invention. The effective amounts of the zinc compounds are generally between 2% and 15% of the total fiber weight, calculated as ZnO.

The mode of operation of the zinc compounds is not fully understood. They are useful when added to the fiber suspension fed to the Fourdrinier wire. They are particularly effective when finely divided and deposited as a suface layer on suspended cellulose fibers, as described above with reference to Attagel. The particles of basic zinc compounds deposited from the solutions of their salts on cellulose fibers by ammonia are much smaller than the fiber diameter. However, they also enhance the acceptor qualities of an asbestos-bearing fibrous web if applied on the paper machine by means of the size press with or without γ-alumina mixture.

Minor amounts of compounds of copper, manganese, chromium, and the transition metals of the iron group have been shown in our simultaneously filed application to improve the light-fastness of colored images produced by means of the γ-alumina mixture alone. They are equally effective in the presence of asbestos fibers in amounts corresponding to 0.1 to 10% CuO, MnO, $Cr_2O_3$, $Fe_2O_3$, CoO, and NiO respectively, based on the total fiber weight. Copper compounds are preferred, and are applied jointly with the γ-alumina mixture either in the fiber suspension or on the size press, a piece of equipment which is a common part of many high-speed paper making machines.

The amounts of dry solids applied to asbestos bearing webs of the invention by means of the size press may be of the order of 0.5 to 3 $g/m^2$ on each treated face of the web. The heavy metal compounds mentioned above are preferably applied by means of the size press because they are only incompletely exhausted from the very dilute fiber suspension and contaminate the white water.

The acceptor sheets of the invention may be further modified in a manner conventional in itself to assume donor qualities, for example, by coating one face of the sheet with a layer of encapsulated or otherwise fixed dye precursors, the other face retaining its acceptor characteristics. To avoid an interaction between the dye precursors in the coating and the asbestos fibers and/or other acceptor particles in the web, a sealer may be interposed between the fibrous substrate and the donor coating. In the absence of such a sealer, pressure applied to either face of the sheet may cause formation of an image. The sheet provided with the sealer may be interposed between another donor sheet and another acceptor sheet prior to pressure application, as by typing.

The following Examples illustrate presently preferred methods of producing recording sheets of the invention suitable for cooperation with commercially available donor sheets, not all the acceptor sheets of these examples being equally effective with all donor sheets which are now staple articles of commerce. The several sheets additionally differ from each other due to their ingredients in a manner partly explained above, and otherwise more fully discussed in or simultaneously filed application.

EXAMPLE 1

An aqueous suspension was prepared in a mixing vat from 42.5% bleached sulfate pulp of coniferous wood ground to a freeness of 60°SR, 42.5% bleached sulfate birch pulp of 25°SR, and 15% asbestos fibers having an average diameter of 200 Å and a surface area of 70 $m^2/g$. The suspension was diluted to a consistency of 0.6% and fed to the Fourdrinier wire of a paper making machine to produce an acceptor sheet which reacted satisfactorily with a donor sheet carrying encapsulated crystal violet lactone, and which weighed 48 $g/m^2$.

EXAMPLE 2

The fibrous components of the web of Example 1 were suspended in water in a weight ratio of 45:45:10, and the suspension was additionally mixed with 6% silton clay and 8%, on a dry basis, of a colloidal attapulgite (Attagel) solution containing 5% solids. The recording paper made from the mixture on a conventional high-speed machine weighed 45 $g/m^2$ and produced with most commercial donor sheets images of better light fastness than the sheet prepared in Example 1.

EXAMPLE 3

A paper weighing 41 $g/m^2$ was obtained under otherwise the same condition as in Example 2, when the silton clay and attapulgite were replaced by 14% γ-alumina mixture, based on the total weight of fibrous components. The mixture contained 10% chemically bound water volatile at 1000° C., and had a surface area of 140 $m^2/g$ as determined by the BET method. The paper was superior to those of Examples 1 and 2 in its cooperation with most donor sheets.

EXAMPLE 4

A paper of particularly good durability and color stability was obtained, when 4% aluminum hydroxide (hydrargillite) replaced an equal weight of γ-alumina mixture in the fiber suspension of Example 3, and the suspension was converted to a web having a dry weight of 90 $g/m^2$.

EXAMPLE 5

The light fastness of colored images produced on recording sheets prepared in the manner of Examples 3 and 4 was greatly improved when the γ-alumina mixture, prior to addition to the fiber suspension, was stirred into dilute copper sulfate solution until it absorbed an amount of copper corresponding to 0.5% CuO, based on the fiber weight in the suspension, whereupon the copper-bearing γ-alumina mixture was separated from most of the copper sulfate solution and added to the fiber suspension.

EXAMPLE 6

The procedures of Examples 1 to 5 were modified only to the extent that they produced webs of equal area weight, but in each run the fibrous web produced on the Fourdrinier wire and subjected to a preliminary drying was further treated on the size press of the paper making machine with an aqueous composition containing 8% dry solids consisting of 30.6 parts soluble starch, 51.3 parts zinc chloride, 17.8 parts γ-alumina mixture, and 0.3 part of a commercial addition agent effective for suppressing foaming and for preventing microbial fermentation of the starch.

The size press treatment contributed 1.5 $g/m^2$ to each face of the paper discharged from the machine which had a total weight of 41 $g/m^2$.

EXAMPLE 7

In the general procedure of Example 6, the size press composition was replaced by an aqueous solution containing 7.5% dissolved matter consisting of 32.3 parts soluble starch, 40.3 parts zinc chloride, and 17.3 parts aqueous ammonia, all parts being by weight. The composition was applied to each side of the web at a dry rate of 0.8 $g/m^2$. The consistency of the initial fiber suspension was modified to produce a paper having an ultimte dry weight of 47 $g/m^2$.

EXAMPLE 8

In yet another series of runs, papers produced in the manner of Examples 1 to 5 were treated on the size press with an aqueous composition containing 8% solids consisting of 58.3 parts soluble starch, 7.7 parts $CuSO_4.5H_2O$, and 17.8 parts γ-alumina mixture as described in Example 3. The size press treatment added 1.5 $g/m^2$ to each side of the sheet whose total weight was 50 $g/m^2$.

EXAMPLE 9

A recording sheet combining low cost with excellent image-forming characteristics was prepared from a fiber suspension consisting of 15% bleached sulfate pulp from coniferous wood ground to a freeness of 60°SR, 15% bleached, sulfate, birch pulp of 25°SR, 70% groundwood. The suspension was further mixed with 8.3 parts asbestos fibers having an average diameter of 200 Å, 12.5 parts γ-alumina mixture as described in Example 3, 1.4 parts hydrargillite, and 1.4 parts auxiliary agents including an antifoaming agent, a preservative, and a commercial sizing composition, all parts of other ingredients being based on 100 parts total fiber content.

The image forming properties and the durability of the formed image were further improved when this sheet was additionally treated in the manner described in Example 8.

While the fibrous material in all Examples consisted of asbestos and cellulose fibers, at least a portion of the cellulose fibers may be replaced by synthetic fibers and others commonly employed in the paper industry without significantly altering the utility of the material as a recording sheet. At this time, there is no economical substitute for cellulose.

Numerous modifications and variations in the illustrated procedures of the Examples will readily suggest themselves to those skilled in the art, particularly in the light of our simultaneously filed application mentioned above.

It should be understood, therefore, that, within the scope of the appended claims, this invention may be practiced otherwise than as specifically described.

What is claimed is:

1. A recording sheet capable of displaying a colored image when contacted under pressure with a substantially colorless member of the group consisting of crystal violet lactone, malachite green lactone, benzoyl leuco methylene blue, and N-phenylleukauramine, said sheet consisting mainly of paper-forming fibrous material, 3 to 30 percent of the weight of said fibrous material being constituted by asbestos fibers uniformly distributed in said sheet, said sheet carrying a surface coating including an amount of a mixture of γ-alumina and precursors of said γ-alumina uniformly distributed in said coating, the amount of said mixture being sufficient to enhance said displaying of a colored image, said precursors being hydrated forms of aluminum oxide capable of being converted substantially completely to γ-alumina when heated from 300° to 1000° C., said mixture containing 1 to 30 percent water volatile at 1000° C.

2. A recording sheet capable of displaying a colored image when contacted under pressure with a substantially colorless member of the group consisting of crystal violet lactone, malachite green lactone, benzoyl leuco methylene blue, and N-phenylleukauramine, said sheet consisting mainly of paper-forming fibrous material, 3 to 30 percent of the weight of said fibrous material being constituted by asbestos fibers uniformly distributed in said sheet, and a zinc compound uniformly distributed in said sheet, the amount of said zinc compound being equal in zinc content to zinc oxide weighing 2 to 15% of said fibrous material.

3. A sheet as set forth in claim 2, wherein said fibrous material includes uniformly distributed cellulose fibers, said zinc compound constituting a particulate surface coating on said cellulose fibers, the size of fhe particles in said coating being smaller than the diameter of said cellulose fibers.

4. A recording sheet capable of displaying a colored image when contacted under pressure with a substantially colorless member of the group consisting of crystal violet lactone, malachite green lactone, benzoyl leuco methylene blue, and N-phenylleukauramine, said sheet consisting essentially of paper-forming fibrous material, 3 to 30 percent of the weight of said fibrous material being constituted by asbestos fibers uniformly distributed in said sheet, the remainder of said fibrous material consisting mainly of cellulose fibers individually coated by a hydrogel of a clay capable of converting a colorless member of said group to a colored dye by contact, the coated cellulose fibers being uniformly distributed in said sheet, said clay amounting to 2% to 20% of the weight of said fibrous material.

5. A sheet as set forth in claim 4, wherein said asbestos fibers constitute between 8 and 15 percent of the weight of said fibrous material.

6. A sheet as set forth in claim 5, wherein said asbestos fibers have an average diameter of 150 to 600 Angstron units.

7. A recording sheet capable of displaying a colored image when contacted under pressure with a substantially colorless member of the group consisting of crystal violet lactone, malachite green lactone, benzoyl leuco methylene blue, and N-phenylleukauramine, said sheet consisting mainly of paper-forming fibrous material, 3 to 30 percent of the weight of said fibrous material being constituted by asbestos fibers uniformly distributed in said sheet, and of a mixture of $\gamma$-alumina uniformly distributed in said sheet in an amount of 2 to 20% of the weight of said fibrous material, said mixture containing 1 to 30 percent water volatile at 1000° C., and said precursors being hydrated forms of aluminum oxide capable of being converted substantially completely to $\gamma$-alumina when heated from 300° to 1000° C.

8. A sheet as set forth in claim 7, further including 2 to 20% of at least one compound selected from the group consisting of aluminum hydroxide and aluminum oxide hydrate, based on the weight of said fibrous material, said at least one compound being uniformly distributed in said sheet.

9. A sheet as set forth in claim 7, further including a compound of a metal selected from the group consisting of copper, manganese, chromium, iron, cobalt, and nickel, said compound being uniformly distributed in said sheet in an amount corresponding to 0.1 to 10 percent of the corresponding oxide, based on the weight of said fibrous material, said oxide being CuO, MnO, $Cr_2O_3$, $Fe_2O_3$, CoO, or NiO.

10. A sheet as set forth in claim 9, wherein said metal is copper.

* * * * *